Nov. 8, 1966  J. J. UDRY  3,284,038
CABLE CLAMP
Filed May 19, 1965
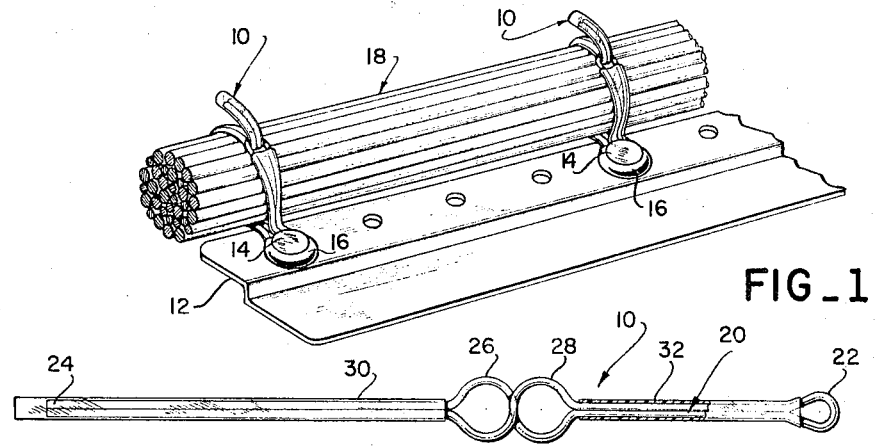
FIG_1
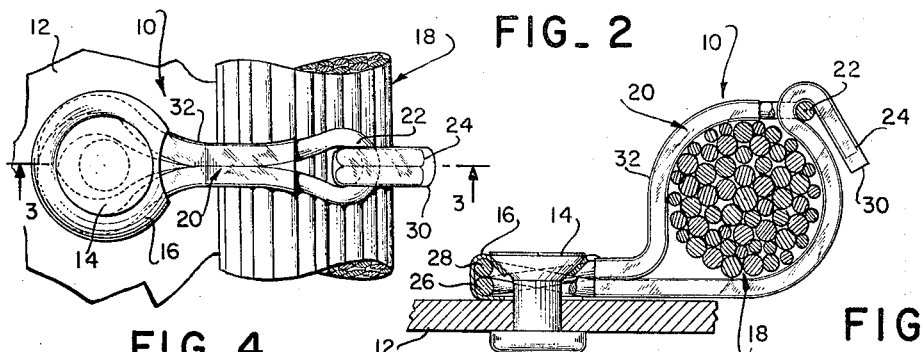
FIG_2
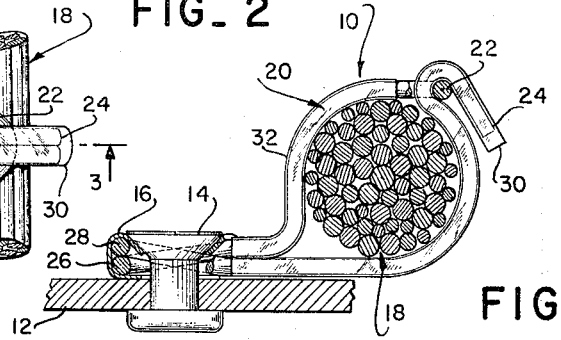
FIG_4   FIG_3
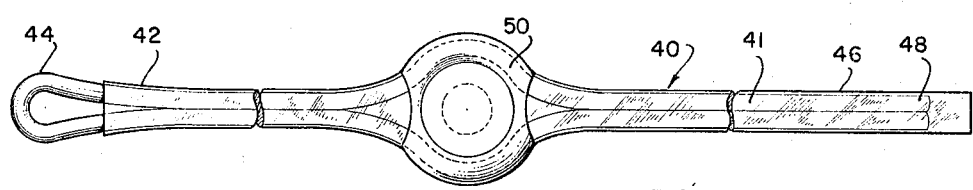
FIG_5
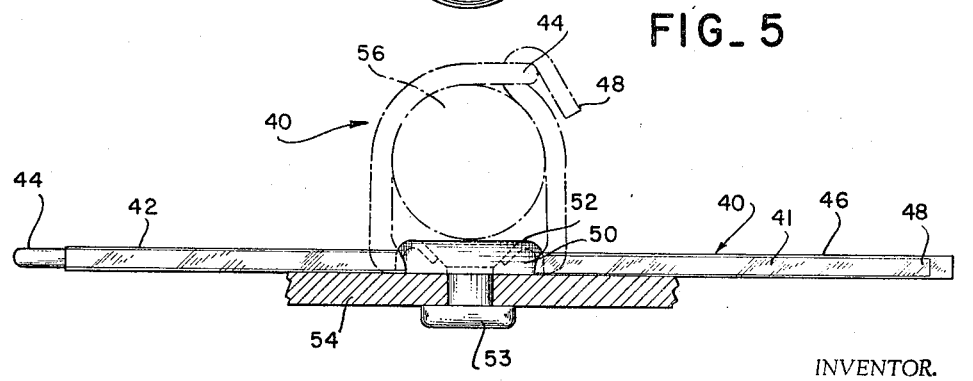
FIG_6
INVENTOR.
JOHN J. UDRY
BY George C. Sullivan
Agent

United States Patent Office 3,284,038
Patented Nov. 8, 1966

3,284,038
CABLE CLAMP
John J. Udry, Woodland Hills, Calif., assignor to Lockheed Aircraft Corporation, Burbank, Calif.
Filed May 19, 1965, Ser. No. 457,051
4 Claims. (Cl. 248—74)

This invention relates to fasteners for supporting elongated objects from fixed supports.

The fastener according to this invention is especially useful for tying and supporting bunched, parallel insulated wire conductors in wired telecommunication systems and in electric circuits for aircraft, and related ground support equipment. The wire conductors are assembled and arranged in "harness fashion" for rapid mounting and connection with other components.

In the past, the installation of electrical circuit harnesses for aircraft, particularly large aircraft, large numbers of insulated conductors are first laced together with cord or twine and these "harnesses" are then mounted on the aircraft by insulated metal rings or clamps being secured on the aircraft by screws or other such devices.

Such prior installation practices involved disadvantages in the extensive time required to secure the prior art rings or clamps upon the aircraft. While the cost of the prior art rings and clamps were relatively minimal, the labor costs during assembly or maintenance of the aircraft have made this type of fastening device extensive and therefore unattractive.

In contrast to the known prior art supporting straps and fasteners, the present invention obviates the disadvantages of the known apparatus by using a wire to support a circuit harness and serves all the functions of the known prior art supporting straps with less components. The present invention is more flexible and adaptable to various sized objects which it is used to support. Additionally the fastener, according to the present invention, may be preassembled upon supporting structure in aircraft for example which then eliminates one operation which must be performed within the aircraft and accordingly reduces the time for assembly.

In its broadest sense, the fastener in accordance with the present invention is formed from a length of wire having a loop at one end and a free end opposite the loop. The wire is secured to a supporting structure at a point between the loop and the free end and by disposing an elongated object to be supported by the fastener, between the loop and the free end, the wire can be entwined around the elongated object and the free end inserted through the loop and folded back on itself to support the elongated object in a rigid manner.

The folded wire can have either one or two loops disposed between the free end or the closed loop at the opposite end for purposes of surrounding and encircling an attaching means on the supporting structure.

In another embodiment, the invention extends to a fastener which has a length of wire folded upon itself and having a first closed loop at one end and a free end opposite the closed loop. The wire has a second loop being formed between the first loop and the wire free end and has two lengths of insulating tubing extending around and conforming to the folded wire and being disposed both between the first and second loops and the second loop and the free end.

The term "wire" as used in this specification means a thin thread or rod of metal, plastic or like material. The thread or rod can have single or multiple strands and formed from single or composite materials.

Other features and advantages of the present invention will become more apparent upon review of the appended drawings and the following description in which:

FIGURE 1 is a perspective view of a pair of fasteners constructed in accordance with the present invention and supporting a bunch of conductors;

FIGURE 2 is a plan view of a fastener, per se, according to the present invention being shown in an unfolded position;

FIGURE 3 is a side elevation shown partly broken away of the fastener as shown in FIGURE 1;

FIGURE 4 is a plan view of a fastener illustrated in FIGURES 1 and 3;

FIGURE 5 is a plan view of another embodiment of the present invention shown with a fastener unfolded; and FIGURE 6 is a side elevation shown partly broken away of a fastener illustrated in FIGURE 5 and including a phantom view of the fastener encircling a cylindrical object.

Referring now to FIGURE 1, the present invention is in the form of a fastener 10 being retained upon an elongated, rigid supporting structure 12 by a rivet 14 and a washer 16. The fastener 10 envelopes and conforms to a group of parallel conductors 18.

As best shown in FIGURE 3, the conductors 18 are both supported upon the structure 12 and fastener 10 is in the nature of a cantilever construction which permits a slight amount of variation or vibration of the conductors 18 without permitting contact upon the supporting structure 12. The conductors 18 are given by way of example of the type of elongated structures which may be supported upon the fasteners and other equivalent and suitable elongated objects take the form of hydraulic tubing, piping, tubes and the like may equally be used in conjunction with the present invention.

Referring now to FIGURES 2–4, one embodiment of the present invention takes the form of a fastener and includes a length of continuous wire 20 being formed with a closed first loop 22 at one end and folded upon itself along its entire length. The wire includes a free end 24 which is opposite the first closed loop 22. Intermediate the closed loop 22 and the free end 24 is a pair of second and third loops 26 and 28 which are then twisted 180° to abut each other and serve to encircle the rivets 14 as best shown in FIGURE 3. The wire 20 as shown in FIGURE 2 gives the plan form of the wire in an assembled condition before it is mounted and secured upon the supporting structure 12.

For purposes of insulating the wire 20 and preventing the wire from moving from its folded condition, a pair of insulated tubes 30 and 32 encircle and conform to the folded wire respectively between the free end 24 and the loop 26 and the first loop 22 and the second loop 28. In the most preferred embodiment of the present invention, the tubes 30 and 32 are formed from irradiated lengths of polyethylene pipe which may be slipped over the folded tube and then heated to cause them to contract and conform to the folded wire. This type of construction then prevents the wire from unfolding and gives the folded wire more body in the essembled condition.

Referring now to FIGURES 1, 3 and 4, the fastener 10 is mounted upon the supporting structure 12 by folding the loops 26 and 28 over upon each other until they are concentrically positioned one above the other and the rivet 14 is extended therethrough. The cup-type washer 16 extends over the loops 26 and 28 and serves to secure the loops against the supporting structure 12; this washer permits the fastener to be preassembled before being mounted on any supporting structure. The rivet 14 is then upset to secure the fastener 10 against the supporting structure 12. The important feature of the present invention is that the fastener 10 can be mounted upon a supporting structure 12 before the structure 12 is mounted within other components such as an aircraft and thus tends to cut down on the amount of installation time for the various components.

As shown in FIGURES 1, 3 and 4, the group of conductors 18 is placed between the two extremities of the fastener 10 and the free end 24 is strung by hand through the closed loop 22 and tension is applied with an assembler's fingers until the conductors are rigidly retained within the fastener. The free end 24 is then doubled over upon itself by the assembler's fingers to prevent removal of the conductors 18 from the fastener 10. During any disassembly procedure, the conductors 18 can also be removed from the fastener 10 by unfolding the free end 24 and pulling it from the closed loop 22 thus permitting the conductors 18 to be withdrawn from the fastener 10.

Referring now to FIGURES 5 and 6, there is illustrated another embodiment of the present invention wherein a fastener 10 is formed from a length of continuous wire 41 which is doubled upon itself along its entire length. The fastener 40 includes a first end 42 with a closed loop 44 at a first extremity opposite the closed loop 44. Intermediate the closed loop 44 and the free end 48 is a second loop 50 which is formed by separating the folded wire 41 and this loop encircles a rivet 53 extending through a supporting structure 54.

The second closed loop 50 is covered in part by a washer 52 that mates with the second loop and serves to retain the fastener against the supporting structure 54 through the medium of the rivet 53. This embodiment of the present invention tends to have a more compact profile as may be seen by comparing FIGURES 3 and 6. Once the fastener 40 is mounted upon the supporting structure 54, the elongated object 56 is arranged over the rivet 53 and the one end 42 is wrapped around the object until the loop 44 extends around as far as it can and the second end 42 is equally wrapped around the opposite side of the elongated object 56 until the free end 48 may be inserted through the closed loop 44. As in the previous embodiment, the free end 48 is threaded through the closed loop 44 and doubled over upon itself to prevent accidental removal of the elongated object 56 from the fastener 40.

The specific arrangement of how the fasteners according to the present invention are mounted on supporting structure can be varied without departing from the scope of the present invention. For example, the loops between the extremities of the fastener can be eliminated and the fastener can be welded, brazed or soldered directly to supporting structure. Alternately, when using a securing device such as screws or rivets to hold the fastener upon a supporting structure, these same loops can be eliminated or revised to form partial loops and still perform the same function as taught by the present invention. This invention is only intended to be limited by the following claims.

I claim:

1. A fastener for supporting an elongated object and being attached to a supporting structure comprising:
    a length of continuous wire folded upon itself over its entire length forming a loop at one end and having a free end on the other end, and
    means for insulating the wire encompassing and conforming to the folded wire substantially over the wire's entire length tending to prevent the wire from moving from its folded condition.

2. A fastener for supporting an elongated object and being secured to a supporting structure by a fastening means comprising:
    a length of wire folded upon itself forming a loop at one end and having a free end on the other end,
        the wire including a second loop for extending around the fastening means, and
    means for insulating the wire encompassing and conforming to the folded wire tending to prevent the wire from moving from its folded condition.

3. A fastener for supporting an elongated object and being secured on a supporting structure comprising:
    a length of wire being folded upon itself and having a first closed loop at one end and having a free end opposite the loop,
    the wire having a second loop formed between the first loop and the wire free end,
    a first length of insulation tubing extending around and conforming to the folded wires between the first and second loops,
    a second length of insulating tubing extending around and conforming to the folded wire extending from the second loop up to and past the wire free end, a fastening means mounted on the supporting structure, and
    the fastening means extending through the wire second loop and gripping the wire and the supporting structure.

4. A fastener for supporting an elongated object and being secured on a supporting structure comprising:
    a length of wire being folded upon itself and having a first closed loop at one end and having a free end opposite the loop,
    the wire having a second and a third loop formed between the first loop and the wire free end, the second and third loops being folded together,
    means for retaining the wire in its folded condition,
    a fastening means being secured to the supporting structure, and
    the fastening means extending through the wire second and third loops and gripping the wire and the supporting structure.

References Cited by the Examiner

UNITED STATES PATENTS

| | | | |
|---|---|---|---|
| 178,156 | 5/1876 | Jewett | 24—16 |
| 1,536,228 | 5/1925 | Leslie | 24—27 |
| 1,592,479 | 7/1926 | Williams | 24—20 |
| 1,719,136 | 7/1929 | Rosenberg | 85—41 |
| 1,814,502 | 7/1931 | Barwood | 85—50 |
| 2,091,626 | 8/1937 | Bradley | 24—27 |
| 2,426,708 | 9/1947 | Robertson et al. | 248—74 |
| 2,459,307 | 1/1949 | Churchill | 248—74 |
| 2,936,980 | 5/1960 | Rapata | 248—74 |
| 3,099,054 | 7/1963 | Spiro | 24—16 |

CLAUDE A. LE ROY, *Primary Examiner.*